US012664205B2

(12) United States Patent
Gong et al.

(10) Patent No.: US 12,664,205 B2
(45) Date of Patent: Jun. 23, 2026

(54) METHOD AND SYSTEM FOR A SEMANTIC TEXTUAL SIMILARITY SEARCH

(71) Applicant: NEC LABORATORIES EUROPE GMBH, Heidelberg (DE)

(72) Inventors: Na Gong, Heidelberg (DE); Carolin Lawrence, Heidelberg (DE); Timo Sztyler, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 229 days.

(21) Appl. No.: 18/254,191

(22) PCT Filed: Oct. 5, 2021

(86) PCT No.: PCT/EP2021/077454
§ 371 (c)(1),
(2) Date: May 24, 2023

(87) PCT Pub. No.: WO2023/284991
PCT Pub. Date: Jan. 19, 2023

(65) Prior Publication Data
US 2024/0028631 A1 Jan. 25, 2024

(30) Foreign Application Priority Data
Jul. 14, 2021 (EP) .................................... 21185576

(51) Int. Cl.
*G06F 16/383* (2019.01)
*G06F 40/295* (2020.01)
*G06F 40/30* (2020.01)

(52) U.S. Cl.
CPC .......... *G06F 16/383* (2019.01); *G06F 40/295* (2020.01); *G06F 40/30* (2020.01)

(58) Field of Classification Search
CPC ..................................................... G06F 16/383
See application file for complete search history.

(56) References Cited

U.S. PATENT DOCUMENTS

| | | | |
|---|---|---|---|
| 2013/0080428 A1 | 3/2013 | Wang et al. | |
| 2017/0060835 A1 | 3/2017 | Radford et al. | |

(Continued)

FOREIGN PATENT DOCUMENTS

| | | | | |
|---|---|---|---|---|
| CN | 110688474 A | * | 1/2020 | ........... G06F 16/335 |
| JP | 2013069279 A | | 4/2013 | |

(Continued)

*Primary Examiner* — Grace Park
(74) *Attorney, Agent, or Firm* — Leydig, Voit & Mayer, Ltd.

(57) ABSTRACT

A method of performing a semantic textual similarity search between a target document and a set of source documents includes: selecting target textual data from the target document; identifying and classifying, name entities for each textual sequence of the target textual data; generating, a semantic textual similarity model and using the semantic textual similarity model to generate textual embedding of the identified name entities for each textual sequence of the target textual data; aggregating the textual embedding with the structural features of the target textual data to generate target document embedding; searching, by a similarity estimator, for similar documents by measuring similarities of the target document embedding with embeddings of each source document of the set of source documents; and computing explanatory information about a degree of similarity between the target document and any document of the set of the source documents.

19 Claims, 3 Drawing Sheets

(56)                    References Cited

U.S. PATENT DOCUMENTS

2020/0125648 A1*  4/2020  Jiang ...................... G06F 16/93
2020/0250239 A1*  8/2020  Huang ............... G06F 16/3347
2022/0076843 A1*  3/2022  Masculo ........... G08B 21/0202
2022/0114340 A1*  4/2022  Graeser .................. G06N 3/045
2022/0318504 A1*  10/2022  Malkiel .............. G06F 16/9538
2022/0335066 A1*  10/2022  Hedayati ................ G06N 20/00
2022/0414336 A1*  12/2022  Abraham ............. G06F 40/216

FOREIGN PATENT DOCUMENTS

JP          2015200962  A      11/2015
JP          2017045453  A       3/2017
JP          2020154790  A       9/2020

* cited by examiner

METHOD AND SYSTEM FOR A SEMANTIC TEXTUAL SIMILARITY SEARCH

CROSS REFERENCE TO RELATED APPLICATIONS

This application is a U.S. National Phase application under 35 U.S.C. § 371 of International Application No. PCT/EP2021/077454, filed on Oct. 5, 2021, and claims benefit to European Patent Application No. EP 21185576.2, filed on Jul. 14, 2021. The International Application was published in English on Jan. 19, 2023 as WO 2023/284991 A1 under PCT Article 21(2).

FIELD

The present invention relates to a system and a computer-implemented method of performing a semantic textual similarity search between a target document and a set of source documents.

BACKGROUND

Semantic textual similarity measures how similar two textual pieces (e.g. documents, paragraphs and terms) are. Existing methods determine the textual similarity based on the token or sentence encoding of the text. However, when a human decides if two texts are similar, apart from the overall textual semantic meaning in the sentence, they usually focus more on whether certain important terms such as the location and organization are matched or not. On the other hand, when an AI system finds the similar document, human users often do not understand how and why the outcome was generated.

SUMMARY

In an embodiment, the present disclosure provides a computer-implemented method of performing a semantic textual similarity search between a target document and a set of source documents. The method comprises: selecting target textual data from the target document; identifying and classifying, by an entity extractor, name entities for each textual sequence of the target textual data; generating, by an embedding stage, a semantic textual similarity model and using the semantic textual similarity model to generate textual embedding of the identified name entities for each textual sequence of the target textual data; aggregating the textual embedding with the structural features of the target textual data to generate target document embedding; searching, by a similarity estimator, for similar documents by measuring similarities of the target document embedding with embeddings of the source documents; and computing, by an explainability generator, explanatory information about a degree of similarity between the target document and any document of the source documents.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
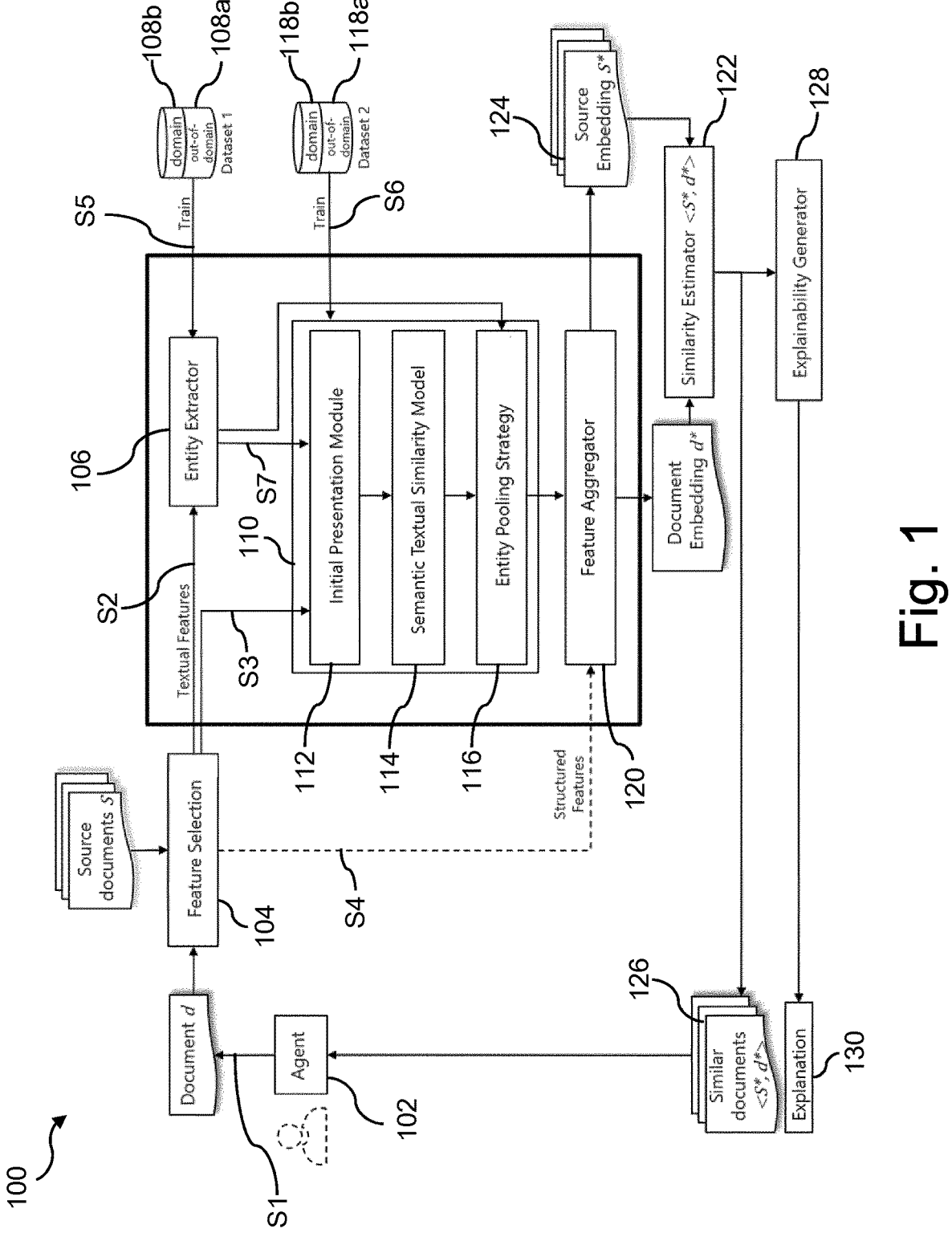
FIG. 1 is a schematic view illustrating an entity-based pooling semantic textual similarity searching system in accordance with an embodiment of the present invention.

In an embodiment, the present invention improves and further develops a method and a system of the initially described type in such a way that the similar documents are identified in a highly efficient and objective way, while at the same time human users are enabled to understand the results.

In accordance with an embodiment, the present invention provides a computer-implemented method of performing a semantic textual similarity search between a target document and a set of source documents, the method comprising: selecting target textual data from the target document; identifying and classifying, by an entity extractor, name entities for each textual sequence of the target textual data; generating, by an embedding stage, a semantic textual similarity model and using the a semantic textual similarity mode to generate the textual embedding of the identified name entities for each document; aggregating the textual embedding with the structural features of the target textual data to generate the target document embedding; searching, by a similarity estimator, for similar documents by measuring the similarities of the target document embedding with all of the source documents embedding; and computing, by an explainability generator, explanatory information about a degree of similarity between the target document and any of the source documents.

Documents may contain text and structured features. With regard to the present invention, the term 'document' is defined as information in the form of, including but not limited to, a document, an audio file, input data, reports, email, publications, free text feedback, or the like. Correspondingly, the term 'textual data' as used herein denotes certain parts selected from a document, e.g., including but not limited, individual sections, one or more sentences, or a series of words.

According to the invention it has first been recognized that apart from the overall semantic meaning of the textual content, the matching of key words often decides whether two texts are similar or not. Embodiments of the present invention enrich the current commonly used token-based or sentence-based semantic similarity search by also utilizing entities of interest which are used for the similarity measurement and provides the corresponding explanation for each similarity match. More specifically, embodiments of the invention address the above-mentioned issues via identifying the important entities and extending the semantic textual encoding with an entity encoding module. Moreover, according to embodiments, the system is configured to provide evidence that explains how similar any two texts are with respects to the similarity of specific entities.

An aspect according to embodiments of the invention is the ability to prioritize different entity types, thus to define the degree of similarity based on certain conditions or specifications. For instance, defined entity types and entity priorities may be provided in form of a priority list of entity types, e.g. specified by a user. By using an entity pooling mechanism that prioritizes different entity types, a use case specific and/or entity-dependent similarity between documents can be determined.

According to an embodiment of the invention, the system may be configured to output those documents, from the set of source documents, that are determined to be similar to the target document together with the explanatory information.

According to an embodiment of the invention, the similarity search exploits both the textual features and the name entity information and, as such, performs better compared to a system that relies on a single one of the information only. This is simply because both parts encode crucial information for computing the similarity between documents. By relying on both parts and by aggregating the entity labels with the original textual tokens, the context is provided, i.e. the word embedding encodes the semantic meaning. This results in a performance improvement since scenarios are addressed in which two equal words with different entity types have the same embedding but actually a different meaning (for example jaguar: car vs. animal).

According to an embodiment, the present invention provides a method/system that computes the word embedding of the textual data by utilizing both the textual features and the extra name entity information. Specifically, the name entities may be used as follows:

a. The system may aggregate the entity labels with the original textual tokens and the token positions to initialize the word embedding for the semantic textual similarity model. Hence, the semantic learning process is considering the important entities all the time.

b. Based on the token embedding generated by the semantic textual similarity model, the entity pooling strategy may produce the final word embedding of the textual data by extracting the embedding of the important entities from the token embedding and aggregating the extracted entity embedding with the sentence embedding (i.e., the sum of the token embedding).

According to an embodiment, the present invention provides a method/system that provides an evidence to explain to which extend documents of a document pair are similar with each other. Benefit from the entity pooling strategy, each important entity has the corresponding entity embedding. Based on the entity embedding, the system can provide the entity-level explanation by measuring the similarity of the specific entities in both documents. For example, the entity-based explanations for textual similarity may be provided in form of a list of how similar two documents are with regard to each entity type of interest.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

Semantic textual similarity (STS) measures how similar two textual pieces (e.g. documents, paragraphs and terms) are. In many cases, apart from the overall semantic meaning of the textual content, the matching of certain key words may be also used to decide whether two texts are similar or not. Embodiments of the present invention enrich the token-based or sentence-based semantic similarity search as commonly used according to current prior art approaches by utilizing entities of interest, which may be important for the similarity measurement, and provide the corresponding explanation for each similarity match.

FIG. 1 schematically illustrates an entity-based pooling semantic textual similarity searching system 100 in accordance with an embodiment of the present invention. More specifically, FIG. 1 illustrates the comprehensive procedures of how the entity-based pooling semantic textual similarity searching system 100 detects the similar document(s) from a set of given document(s). The detailed process according to the illustrated embodiment is as follows:

As shown at S1, the process is firstly triggered by an agent 102 who gives the system 100 an input document d (as a target document to be analyzed). The agent 102 could be, for instance, a data collecting/forwarding system or a human user. The input document d can contain: 1) both structured and unstructured (textual) data; or 2) only the unstructured (textual) data.

If the input document d contains both structured and unstructured data, the process proceeds with a textual feature selection module 104. More specifically, after receiving the input document d from the agent 102, the input document d is forwarded to the textual feature selection module 104 that is configured to execute a feature selection procedure to distinguish the textual features and the non-textual features. As shown at S2 and S3, respectively, the module 104 may be configured to forward only the textual features to the next natural language processing stages, which include an entity extractor 106 and an initial presentation module 112, as will be described in detail below. According to an embodiment of the invention, it may be provided that the non-textual (structure) features, as shown at S4, are forwarded to a feature aggregator 120, for instance depending on the user choice.

According to an embodiment of the invention, the system comprises an entity extractor 106 that is configured to identify, given the textual features, any important entities for each textual sequence and extract them from the text. The important entities (herein sometimes also denoted name entities or just entities or entity types) refer to those entities which are of interest for the agent 102 for each textual input. For example, the entity extractor 106 could be implemented in form of a neural network based language model. According to embodiments of the invention it could be provided that this model is pre-trained on an out-of-domain dataset 108a and fine-tuned on a domain-specific dataset 108b, as shown at S5. This entity identification may be realized as a supervised-learning task; therefore the entities that are considered to be interesting for the agent 102 are labeled in the domain-specific dataset 108b. After learning from the supervised dataset 108b, the entity extractor 106 may classify the entities for each textual sequence based on a generated probabilistic prediction. The identified and classified entities may be forwarded to an embedding stage 110, as shown at S7.

In a next step, the embedding stage 110 may compute word embeddings with the entities previously identified by the entity extractor 106. According to the illustrated embodiment, the embedding stage 110 may comprise a number of sub-processes including an initial presentation module 112, a semantic textual similarity model 114 and an entity pooling strategy 116.

According to an embodiment, the initial presentation module 112 may be configured to receive as input the raw textual feature from the textual feature selection module 104 and the identified entities from the entity extractor 106. The initial presentation module 112 initializes a received textual sequence into an initial numeric embedding by considering two natural elements, that is, the vocabularies and their positions as well as additional entity classes. The additional entity classes may be predefined or may be selected depending on user choice.

The initial numeric embedding is then forwarded to the semantic textual similarity (STS) model 114. According to an embodiment of the invention, the STS model 114 may be configured to convert textual tokens into a numeric embedding, which represents the text's semantic meaning. The tokens are either individual words or sub-word pieces of the textual sequence. Like the entity extractor 106, the STS model 114 could also be implemented in form of a neural network based language model. Notably, this model 114 may be trained with a learning task to predict the similarity of any textual sequence pairs. After training, the model 114 may be used to produce a token-level word embedding of the textual sequences.

The token-level word embedding may then be further processed by the entity pooling strategy 116, which may be configured to take into account the entities extracted from the entity extractor 106. In general, the entity pooling strategy 116 may be responsible for encoding the inputs to generate a textual embedding for each document. The detailed working procedures will be described in connection with FIG. 2 below.

Regarding the training, the three sub-parts of the embedding stage 110 described above can be pre-trained and fine-tuned together in an end-to-end manner on a related out-of-domain and domain-specific dataset 118*a*, 118*b*. Alternatively, the entity pooling strategy 116 can also be used to directly encode the document-level textual embedding without any training or fine-tuning.

Next, according to embodiments of the present invention, textual and non-textual features may be aggregated. To this end, the textual embedding as determined by the embedding stage 110 may be forwarded to the feature aggregator 120. Furthermore, if the input document d contains non-textual (structure) features, it may be provided that these features, are also forwarded to the feature aggregator 120, as shown at S4. Based on these two inputs, the feature aggregator 120 may be configured to integrate both the textual embedding and the structure features, such as by using concatenation or any other suitable operations, to generate a final document embedding d\*. As the result, the final document embedding d\* contains both the structured and unstructured information. If no structured information is available, the feature aggregator 120 could just be a transformation to generate the final document embedding or simply pass on the embedding of the unstructured information, as received from the embedding stage 110.

Next, according to embodiments of the present invention, the document similarity may be estimated by a similarity estimator 122. To this end, given the document embedding d\*, the similarity estimator 122 may be configured to search for similar documents in a set 124 of possible documents S\*. According to an embodiment, this task may be performed by measuring the similarities between the document embedding d\* and all the source documents embedding S\*, thereby generating a set 126 of similar documents <S\*, d\*>. The source documents embedding S\* may be encoded based on source documents S in the same way as the document d\* and as described above (i.e. including the steps of textual features selection, entity identification, word embedding and feature aggregation).

According to an embodiment of the invention, the similarity estimator 122 may be configured to operate on the embeddings outputted by the feature aggregator 120 and, based thereupon, to identify similar documents. For instance, the similarity estimator 122 can be an unsupervised clustering algorithm. Specifically, the similarity estimator 122 may assign each source document a similarity score. Depending on the setting, the output of the similarity estimator 122 could be, for instance, the top k most similar documents (where k is a configurable parameter), or all the source documents above a chosen similarity score or threshold. Alternatively, the source documents could just be ranked within their database according to their similarity score.

According to an embodiment of the invention, the results may be explained by means of an explainability generator 128. In this context it may be provided that after finding the similar documents <S\*, d\*>, the explainability generator 128 is configured to provide explanations 130 (i.e. to explain the reason(s)) why those documents are believed by the system to be similar to the respective input document d. The details of this procedure will be described in connection with FIG. 3 below.

After the system 100 found similar documents <S\*, d\*> and the corresponding explanations 130, these information are sent back to the agent 120 and the process ends.

Figure 2:
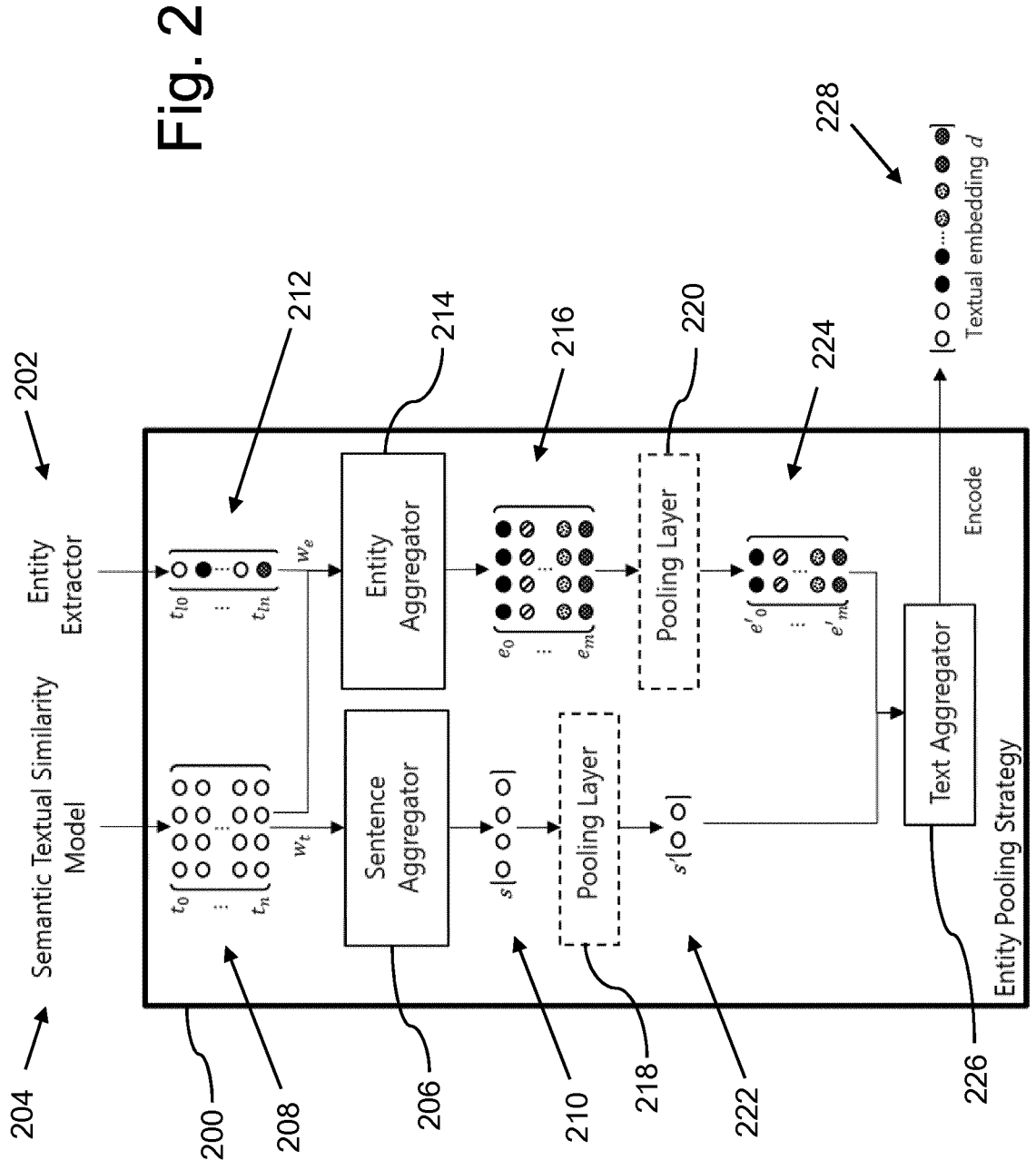
FIG. 2 is a schematic view illustrating an entity pooling strategy in accordance with an embodiment of the present invention.

FIG. 2 schematically illustrates an entity pooling strategy 200 in accordance with an embodiment of the present invention. For instance, the entity pooling strategy 200 may serve as the entity pooling strategy 116 of the entity-based pooling semantic textual similarity searching system 100 described in connection with FIG. 1. More specifically, FIG. 2 illustrates a detailed working process how the entity pooling strategy 200 encodes the output of a semantic similarity model, for instance semantic similarity model 114 of the system of FIG. 1, in conjunction with the entity information to generate a final textual embedding for each document. Generally, the entity pooling strategy 200 computes the textual embedding of a text by utilizing both 1) the general semantic understanding on a sentence level and 2) specific important terms on an entity level, as will be explained hereinafter in detail.

As shown in FIG. 2, the entity pooling strategy 200 may be triggered by the outputs of an entity extractor 202, e.g. entity extractor 106 of the system of FIG. 1, and a semantic textual similarity model 204, e.g. semantic textual similarity model 114 of the system of FIG. 1, that serve as the input to the entity pooling strategy 200.

The notation used in FIG. 2 is as follows:

$t_i$: token
$w_i$: weight of each token
$t_{li}$: entity label of each token
$w_e$: weight of each entity
s: sentence embedding
$e_i$: entity embedding
s': pooled sentence embedding
$e'_i$: pooled entity embedding
d: document embedding As a first step of the entity pooling strategy 200, a sentence embedding is generated. To this end, the entity pooling strategy 200 may include a sentence aggregator 206 that is configured to encode a token embedding 208 of the semantic textual similarity model 204 into a sentence embedding 210. The token embedding 208 is a multi-dimensional matrix, where each row represents the word embedding of one token in the respective sequence. The sentence embedding 210 represents the same sequence with a single dimensional matrix/vector, which compresses all the information present in the token embedding 208.

According to an embodiment of the invention, the sentence aggregator 206 may be a neural network that pools a multi-dimensional word embedding into one single dimensional matrix/vector. Alternatively, the token aggregation 208 can be weighted by setting token weights Wt and computing a weighted sum. The token weights Wt can be learned along with the embedding procedure performed by the embedding stage 110 (as described above in connection with FIG. 1). Alternatively, the token weights Wt may be defined by domain experts, for example.

According to prior art, an instantiation of the sentence embedding generation as described above with a neural network is a commonly used method for sentence-based embedding for semantic textual similarity searching. On top of this, embodiments of the present invention extend this sentence embedding further by involving additional entity information.

As a second step of the entity pooling strategy 200, an entity embedding is extracted. To this end, the token embedding 208 is forwarded together with the entity classes 212, as identified by the entity extractor 202, and possibly with the optional token weights Wt and entity weights We to an entity aggregator 214. The entity classes 212 are represented by a vector, where each element shows the entity type for one token. The optional We defines the weight of each entity type. Like the token weights Wt, the entity weights We can also be learned along with the embedding procedure performed by the embedding stage 110 (as described above in connection with FIG. 1) or defined by domain experts.

According to an embodiment of the invention, the entity aggregator 214 may be configured to extract the embedding of the entity classes 212 of interest, which can be defined manually beforehand, as shown at 216, from the token embedding 208 by aggregating for each entity type all token embeddings belonging to this entity type 212. As the result, the entity embedding 216 is a two-dimensional matrix whose row length is equal to the number of the entity types.

After getting the sentence embedding 210 and the entity embedding 216 from the sentence aggregator 206 and the entity aggregator 214, respectively, as described above, two additional pooling layers 218, 220 can be applied, respectively, to compress the sentence and entity embedding lengths further. The compressed beddings are shown at 222 and 224, respectively. This compression is an optional step depending on the user choice.

In a next step, it may be provided that both the pooled sentence embedding 222 and the pooled entity embedding 224 are given as input to a text aggregator 226 to aggregate the textual embedding. If the pooling layers 218, 220 are not used, the sentence embedding 210 and the entity embedding 216, which are generated before the pooling layers, can directly be used as input for the text aggregator 226. The text aggregator 226 may be configured to integrate two inputs into a single dimensional textual embedding 228. As will be appreciated by those skilled in the art, there are many possibilities regarding the aggregation methods, such as the concatenation of the individual embeddings, for example.

The process of the entity pooling strategy 200 ends once the textual embedding 228 is produced.

Figure 3:
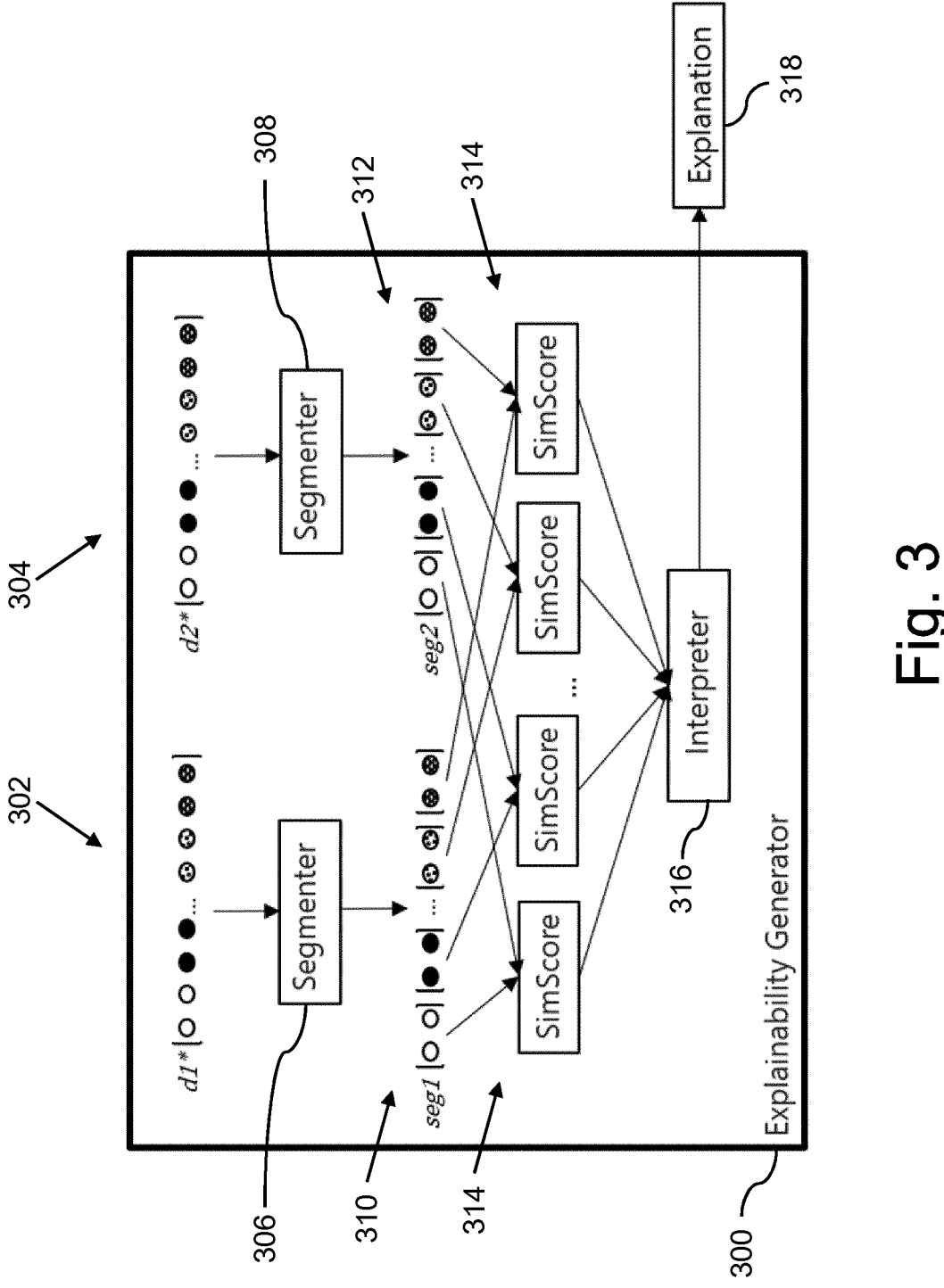
FIG. 3 is a schematic view illustrating an explainability generator used in an entity-based pooling semantic textual similarity searching system in accordance with an embodiment of the present invention.

FIG. 3 schematically illustrates an explainability generator 300 in accordance with an embodiment of the present invention. For instance, the explainability generator 300 may serve as the explainability generator 128 of the entity-based pooling semantic textual similarity searching system 100 described in connection with FIG. 1. In this context, according to an embodiment the explainability generator

300 may be set by a user and triggered and executed once the set 126 of similar documents <S*, d*> is found.

A process carried out by the explainability generator 300 is a segmentation of the document embedding. According to an embodiment, for the target document embedding d* and each corresponding similar document embedding d2*, the following process may be run:

A pair <d1*, d2*> is given to the explainability generator 300, where d1* (as shown at 302) is equal to d* and d2* (as shown at 304) belongs to S. For the input d1*, a first segmenter 306 divides the embedding into partitions seg1 (as shown at 310) based on the document embedding (i.e., the sentence embedding 210, each single entity embedding 216 (i.e. each row of the respective matrix) and each structure feature). In the same way, the input d2* is partitioned by a second segmenter 308 into partitions seg2 (as shown at 312).

In a next step, a segment-level similarity may be estimated. According to an embodiment, given seg1 (as shown at 310) and seg2 (as shown at 312), the similarities between each partition are estimated pairwise. For example, a similarity score (SimScore) of a specific entity type ei can be computed by calculating the cosine similarity between the two embeddings of the entity ei in d1 and d2. Ideally, the similarity calculation should be the same as the calculation used by the similarity estimator 122 (as described in connection with FIG. 1). After this step, each partition 310, 312 has a SimScore 314.

In the next step, the results are interpreted. More specifically, based on the SimScores 314, an interpreter 316 may construct final explanations 318 (corresponding to the explanations 130 depicted in FIG. 1). The explanations may contain information about a degree the document pairs are similar to each other and which partition/components contribute the most to this conclusion. Once the explanation 318 is produced, the processing of the explainability generator 300 may end.

To summarize, according to an embodiment the present invention provides a method and a system of performing a semantic textual similarity search between a target document and a set of source documents, comprising the following steps/components:

A. Setting up a new system, including
   1) Providing a domain-specific dataset with both the name entities and the similarity label/degree.
   2) Providing the source documents (where the similar documents come from). The source documents may also serve as a dataset to train the entity extractor and the semantic textual similarity model.
   3) Instantiating the entity extractor (e.g. training a neural network based entity extractor), which explores the patterns of the important entities from the given documents to identify the important entities from the unknown document.
   4) Instantiating the semantic textual similarity model (e.g. training a neural networked STS model), which predicts the similarity between the given document pairs to generate the textual embedding of the unknown document.
   5) Implementing the Entity Pooling Strategy: decide a sentence, entity and text aggregation method respectively.
   6) Instantiating the similarity estimator to search the similar documents from the source documents and deciding how to return the similar documents (top-k, ranking, threshold-based).

7) Computing the document embedding of the source document to be prepared for the future similarity searching.

8) Instantiating the explainability generator.

B. When a new document (target document) is provided to be analyzed

1) Inputting the document into the system.

2) Collecting and outputting the returned similar documents and the optional explanations.

Although the present invention can be used in many different applications, hereinafter, by way of example, four different uses case will be explained in some more detail. In particular, the present invention can be used in many applications where AI predictions are presented to human users. For example, it can be used in any instance where semantic textual similarity (STS) searching can be used, such as in the public services, public safety or biomedical domains. Two differentiators to common STS systems are the entity and explanation aspects, i.e., 1) the system encoded the textual data based on the important entities; 2) the system explains why the two texts are believed by the system to be similar by providing the detail similarity degree of specific entities. The explanation/transparency is a critical factor for the realistic applications in many domains like the public safety.

According to a first one of these use cases, embodiments of the invention may be applied in connection with duplicated incident detection for a traffic accident. Generally, duplicate incident detection aims at helping a police system to quickly react to traffic accidents by searching the similar incident type and referencing the disposition of the similar accidents. This will save time and resources and improve the effectiveness of the dispatching. Given the textual incident report and the entities of interest, embodiments of the invention provide a system that can automatically detect the similar incidents. To do so, the entity extractor may first extract the important entities from the text, such as number/type of vehicles involved in the accident, location and the injured person(s). The semantic textual similarity model may compute the token-level embedding of the report. The entity pooling strategy may then aggregate all the token embedding into a single dimensional report embedding by taking into account the extracted entities. If the structured features are available, the report embedding can be enriched by simply concatenating the structured features. Based on the (enriched) report embedding, the similarity estimator may return the similar incidents by evaluating the similarity of the input incident with all the recorded incidents. As a result, by referencing the reaction of the similar accident(s) found by the system, an associated dispatching system can quickly adjust any remote-controlled road devices, for example, digital speed signs, electronic road blocker and cameras (e.g., to take photos/videos of the accident scene as soon as possible).

According to a second exemplary use case, embodiments of the invention may be applied in connection with digital human resource assistants, e.g. for recruiting. In this context, it can be noted that every day caseworkers in job centers need to read large amounts of resumes and job requirements to match the job seekers with proper open jobs. This large reading workload exhausts the caseworkers. This situation is recently getting even worse due to the increasing unemployment results from the global Covid-19 pandemic.

Given the resumes, job requirements and the interested entity types, a system in accordance with embodiments of the present invention can automate the job matching process. The system may first convert each textual job requirement into a job embedding and each resume to resume embedding as follows:

1) The entity extractor may be configured to classify the important entities, such as the position title and the key skills.

2) The semantic textual similarity model may generate the embedding of the text on token level.

3) The entity pooling strategy may then produce the final embedding by aggregating the token embeddings based on the extracted entities.

Based on the job and resume embedding, the similarity estimator may measure the distance between the resume and the job requirements. The explainability generator can explain the details about how similar or different each job and resume pair are with respects to specific entities. As the results, the matched resume can be used as the input for a smart routing system, which then automatically conducts the initial phone interview to check the basic information with the job seeker, such as the current job status (still finding a job or got offers already), preferred job direction and introduce the employer background. Moreover, the smart routing system may be configured to automatically deliver any related educates material or brochure to the respective candidate via post.

According to a third exemplary use case, embodiments of the invention may be applied in connection with drug production, e.g. by automatically finding documents with supporting evidence. In this context, it can be noted that every day new biomedical research articles are published. The number of new publications easily exceeds the number of publications a human can read. This is even truer with regard to publications during the global COVID-19 pandemic, where it is at the same time even more crucial for biomedical researchers to quickly be able to sort and understand new knowledge as it is published in order to advance scientific discovery as quickly as possible.

For example, given a document that suggests Remdesivir as a treatment drug for COVID-19, the method in accordance with embodiments of the invention can quickly identify which other documents also mention this entity with corresponding explanations. To do so, the entity extractor may be configured to firstly identify all the entity types that are interesting for the uses, such as the treatment medication. The semantic textual similarity model may compute the token-level embedding for each document. Based on the identified entity types, the entity pooling strategy may then extract the entity embedding from the token embedding. Given the entity embedding of each document, the similarity estimator may then scan all the documents and compute how similar each pair of documents is with regard to the different entities of interest. Based on the founded similar documents, one can then know which medical treatment works better. As a result, the outcome can be used by a smart medicine production system to automatically adjust the production planning by increasing the production of the medicine identified as being more effective.

According to a fourth exemplary use case, embodiments of the invention may be applied in connection with a digital city maintenance system. Generally, digital city maintenance systems aim at supporting the sustainability of a city infrastructure and city services based on citizens' feedback. For instance, citizen can post free-text feedback to a city service center to report a new infrastructure damage or a street mess in the city center. In this context, a system in accordance with embodiments of the invention may support the smart city system to take proper reaction by detecting duplicated feedback. Given the citizen feedback, the system in accordance with embodiments of the invention may first use the entity extractor to identify the import entities in the text, such as the problem type, location and date. Based on the original text and the entities, the similarity semantic model and the entity pooling strategy may then compute the feedback embedding. By comparing the embedding of any new incoming feedback with all of the already filed feedback, the system can find out duplicated reports. As the result, the output can be used as input to a smart city system to react to a specific problem automatically. For example, if a citizen entered a duplicated damage report (i.e. in relation to a previously reported damage), the system may be configured to show the citizen a message, basically saying 'the reported damage is already under repair'. If not, the smart city system may automatically arrange the maintenance work to repair the damage or send a cleaning robot to sweep the mess. In addition, if issue reports are duplicated at certain times and/or location, the system can automatically anticipate such issues and counter them with preventive measures, e.g. by sending surveillance drones to a specific location (for instance on a Friday night as deterrents because there were repeated reports of vandalism at that location and time in the past).

Compared to the state of art, the approach according to embodiments of the invention has at least some of the following advantages:

Common state of art approach customarily handle the semantic textual similarity (STS) task by measuring the similarity between two texts based on their token or sentence level embedding. Typically, they do not consider the matching of the important entities, which however often dominates the final similarity decision in real word problems. In contrast, the approach according to embodiments of the present invention evaluates the similarity based on the textual encoding that involves both the sentence level embedding and the embedding of important entities. Furthermore, embodiments of the invention provide a system that to is able to provide evidence to explain how the two texts being under investigation are similar with each other on the entity level.

For instance, regarding the performance improvement, the system according to the present invention has been verified by implementing it based on the Sentence Transformer framework as described in N. Reimers and I. Gurevych, "Sentence-BERT: Sentence Embeddings using Siamese BERT-Networks," EMNLP, 2019.

The results are shown in Table 1 below. Top-1 measures whether the most similar candidate which the model find is a real similar document; Top-5 measures whether the model find all the similar documents within the first five most similar candidates; Top-10 measures whether the model find all the similar documents within the first 10 most similar candidates. As can be obtained from Table 1, the system according to the present invention shows better performance than the state-of-art method in general. Particularly, it shows an impressive improvement for the Top-1 score by around 30%.

TABLE 1

| The performance comparison of the system according to the invention with the current state of art. | | |
|---|---|---|
| Metrics | State-of-art | Our system |
| Top-1 | 0.6788 | 0.9591 |
| Top-5 | 0.7932 | 0.9865 |
| Top-10 | 0.9754 | 0.9919 |

Compared to the solution described in Changyu Miao, Zhen Cao, Yik-Cheung Tam, "Keyword-Attentive Deep Semantic Matching," arXiv preprint arXiv:2003.11516, 2020, the approach according to embodiments of the invention has at least some of the following advantages:

The referenced method according to C. Miao et al. also utilizes the entity information to improve the textual similarity matching. Their approach uses an entity-based language model, which directly predicts the similarity between two documents, which means the model requires the pairwise text input for the prediction. However, this setup causes a large computational overhead since every time a new query document comes they need to encode the source documents again. In contrast, the method according to embodiments of the present invention encodes the source documents into textual embedding ahead of time. Therefore, when a new query document comes, only the embedding of the new query document needs to be computed. Then, a fast similarity computation can be applied to compare the new document with all source documents.

Moreover, the referenced method according to C. Miao et al. distinguishes only 'keyword' or 'not keyword', while the system according to the present invention is configured to identify a specific type of different entities. Therefore, the system according to the invention allows the weighted operation of different entities, which brings higher applicability of the system to the real world problem. Consequently, the way in which entity type information is used and combined in the context of the present invention is different. Moreover, the system according to the invention is able to provide entity-based explanations, while the referenced method according to C. Miao et al. cannot.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method of performing a semantic textual similarity search between a target document and a set of source documents, the method comprising:
   selecting target textual data from the target document;
   identifying and classifying, by an entity extractor, name entities for each textual sequence of the target textual data;
   generating, by an embedding stage, a textual embedding of the identified name entities for each textual sequence of the target textual data using a semantic textual similarity model that has been trained with a learning task to predict the similarity of textual sequence pairs;
   aggregating the textual embedding with structural features of the target textual data to generate a target document embedding;
   searching, by a similarity estimator, for similar documents by measuring similarities of the target document embedding with embeddings of the source documents; and
   computing, by an explainability generator, explanatory information about a degree of similarity between the target document and any document of the source documents.

2. The method according to claim 1, further comprising:
   outputting documents, from the set of source documents, determined to be similar to the target document together with the explanatory information.

3. The method according to claim 1, further comprising:
   evaluating, by the similarity estimator, a degree of similarity between the target document and any document of the source documents based on a textual encoding that involves both a sentence level embedding and the embedding of the identified name entities.

4. The method according to claim 1, wherein the entity extractor uses a language model that is trained based on labelled named entities from the set of source documents.

5. The method according to claim 4, wherein the entity extractor uses a language model that is pre-trained on labelled data.

6. The method according to claim 1, wherein the step of outputting documents, from the set of source documents, includes outputting a predefined number (k) of most similar documents or all documents having a degree of similarity that exceeds a predefined threshold.

7. The method according to claim 1, further comprising:
   initializing, by an initial presentation module, given textual features selected from a document and the identified name entities of the document, the textual sequence of the document into an initial numeric embedding by considering vocabularies and their positions within the textual sequence as well as entity classes of the identified name entities.

8. The method according to claim 7, further comprising:
   converting, by the semantic textual similarity model, given the initial numeric embedding from the initial presentation module, textual tokens of the textual sequence of a document into a numeric embedding representing a semantic meaning of the textual sequence, wherein the textual tokens are either individual words or sub-word pieces of the textual sequence.

9. The method according to claim 8, wherein the semantic textual similarity model is a neural network based language model.

10. The method according to claim 1, further comprising:
    encoding, by an entity pooling strategy, the output of the semantic textual similarity model in conjunction with the identified name entities to generate the textual embedding for each document.

11. The method according to claim 10, wherein the entity pooling strategy comprises a sentence aggregator that encodes a token embedding of the semantic textual similarity model into a sentence embedding, wherein the token embedding is a multi-dimensional matrix where each row represents z word embedding of one token in a respective textual sequence.

12. The method according to claim 10, wherein the entity pooling strategy comprises an entity aggregator that, given the token embedding and the entity classes of the identified name entities, generates, by aggregating for each name entity all token embeddings belonging to the respective name entity, an entity embedding as a two-dimensional matrix whose row length is equal to a number of entity types.

13. The method according to claim 12, wherein the sentence embedding and the entity embedding, after running through pooling layers for compressing the embedding length, are integrated, by a text aggregator into a single dimensional textual embedding.

14. The method according to claim 1, further comprising:
    dividing, by the explainability generator, the target document embedding and each of the similar document embedding into partitions;
    estimating the similarities between each partition pairwise and computing, for each partition, a similarity score; and
    computing the explanatory information about a degree of similarity between the target document and any of the source documents based on the similarity scores.

15. The method according to claim 14, wherein computing the similarity score includes calculating a cosine similarity between the embeddings of one of the name entities in the partitions.

16. The method according to claim 14, wherein the explanatory information indicates which of the partitions contributed to the degree of similarity between the target document and any of the source documents.

17. The method according to claim 1, further comprising identifying, by a textual feature selection module, unstructured and the structured features from the target document, wherein the structured features are provided to a feature aggregator, wherein aggregating the textual embedding with the structural features of the target textual data to generate the target document embedding is executed by the feature aggregator, wherein the feature aggregator generates the target document embedding by concatenating the textual embedding and the structural features, and wherein the structured features are non-textual feature of the target document.

18. The method according to claim 1, wherein the documents include resume and job requirement documents and wherein the name entities relate to information items including position title and key skills; or wherein the documents include biomedical research articles and wherein the name entities relate to information items including disease and treatment medication; or wherein the documents include incident detection reports and wherein the name entities relate to information items including number/type of vehicles involved in an accident, location and injured person(s); or wherein the documents include citizen feedback in a city service center and wherein the name entities relate to information items including problem type, location and date.

19. A system comprising one or more processors that, alone or in combination, are configured to provide for execution of a method performing a semantic textual similarity search between a target document and a set of source documents, the method comprising:

selecting target textual data from the target document;

identifying and classifying name entities for each textual sequence of the target textual data;

generating a textual embedding of the identified name entities for each textual sequence of the target textual data using a semantic textual similarity model that has been trained with a learning task to predict the similarity of textual sequence pairs;

aggregating the textual embedding with structural features of the target textual data to generate a target document embedding;

searching for similar documents by measuring similarities of the target document embedding with embeddings of the source documents; and computing explanatory information about a degree of similarity between the target document and any document of the source documents.

\* \* \* \* \*